(12) United States Patent
Akahori

(10) Patent No.: US 8,339,673 B2
(45) Date of Patent: Dec. 25, 2012

(54) METHOD AND APPARATUS FOR IMPROVING EDGE SHARPNESS WITH ERROR DIFFUSION

(75) Inventor: Taisuke Akahori, Toyokawa (JP)

(73) Assignee: Minolta Co., Ltd., Osaka-Shi, Osaka (JP)

(*) Notice: Subject to any disclaimer, the term of this patent is extended or adjusted under 35 U.S.C. 154(b) by 1204 days.

(21) Appl. No.: 10/454,605

(22) Filed: Jun. 5, 2003

(65) Prior Publication Data

US 2004/0174566 A1    Sep. 9, 2004

(30) Foreign Application Priority Data

Mar. 7, 2003 (JP) .................................. 2003-61431

(51) Int. Cl.
*G06K 15/00* (2006.01)
*G06K 9/00* (2006.01)

(52) U.S. Cl. ........ 358/3.03; 358/1.9; 358/2.1; 358/3.04; 358/3.05; 358/3.06; 358/3.13; 358/3.14; 358/3.15; 358/3.18; 358/3.22; 358/534; 358/536; 358/3.23; 358/465; 358/466; 382/172; 382/251; 382/252; 382/266; 382/270; 345/98; 345/132; 345/138; 345/141; 345/127; 345/128; 345/129; 345/130; 345/467; 345/441; 345/472; 345/616; 347/15; 347/41; 347/43; 347/131; 347/184

(58) Field of Classification Search ................... 358/2.1, 358/534, 3.15, 3.27, 305, 3.13, 3.23, 465, 358/1.9, 3.21–3.22, 466, 3.03–3.06, 3.14, 358/3.18; 382/252, 199, 266, 269, 309, 162, 382/163, 172, 270, 262, 251; 345/98, 132, 345/138, 141, 127–130, 467, 441, 472, 616
See application file for complete search history.

(56) References Cited

U.S. PATENT DOCUMENTS

| | | | | | |
|---|---|---|---|---|---|
| 5,018,024 | A | * | 5/1991 | Tanioka ......................... | 358/2.1 |
| 5,077,615 | A | * | 12/1991 | Tsuji ............................. | 358/3.1 |
| 5,086,484 | A | * | 2/1992 | Katayama et al. ............ | 382/270 |
| 5,101,283 | A | * | 3/1992 | Seki et al. ..................... | 358/3.13 |
| 5,206,719 | A | * | 4/1993 | Ikeda et al. ................... | 358/518 |
| 5,408,338 | A | * | 4/1995 | Koike ........................... | 358/448 |
| 5,418,574 | A | * | 5/1995 | Miyabata et al. ............. | 348/625 |
| 5,477,244 | A | * | 12/1995 | Shibata et al. ................. | 347/19 |
| 5,497,180 | A | * | 3/1996 | Kawakami et al. ........... | 347/131 |

(Continued)

FOREIGN PATENT DOCUMENTS

EP        1 126 693 A1      8/2001

(Continued)

*Primary Examiner* — Steven Kau

(74) *Attorney, Agent, or Firm* — Buchanan Ingersoll & Rooney PC

(57) ABSTRACT

A method and apparatus for processing an image are provided that can suppress blur edges at an edge portion of a character so that sharpness and quality of the image can be improved. The apparatus comprises an inside and outside edge discrimination portion for discriminating whether a target pixel to be processed belongs to an inside edge or to an outside edge, a threshold value generating portion for selecting a threshold value from plural threshold values for error diffusion process in accordance with an area discriminated by the inside and outside edge discrimination portion to output the selected threshold value and an error diffusion process portion for performing the error diffusion process for multilevel input data concerning the target pixel by utilizing the threshold value generated by the threshold value generating portion so as to produce output data whose gradation steps are reduced.

23 Claims, 6 Drawing Sheets

U.S. PATENT DOCUMENTS

| | | | |
|---|---|---|---|
| 5,712,927 A * | 1/1998 | Kim et al. | 382/252 |
| 5,771,107 A * | 6/1998 | Fujimoto et al. | 358/464 |
| 5,787,195 A | 7/1998 | Tsujimoto et al. | |
| 5,832,115 A * | 11/1998 | Rosenberg | 382/199 |
| 5,850,293 A * | 12/1998 | Suzuki et al. | 358/3.27 |
| 6,476,876 B1 * | 11/2002 | Matsunaga et al. | 348/625 |
| 6,621,595 B1 * | 9/2003 | Fan et al. | 358/3.26 |
| 6,731,400 B1 * | 5/2004 | Nakamura et al. | 358/1.9 |
| 6,873,373 B2 * | 3/2005 | Yamaki | 348/625 |
| 6,977,757 B1 * | 12/2005 | Takahashi et al. | 358/3.05 |
| 7,099,045 B2 * | 8/2006 | Nabeshima | 358/2.1 |
| 7,158,261 B2 * | 1/2007 | Kurose | 358/2.1 |
| 7,345,791 B2 * | 3/2008 | Washio | 358/3.13 |
| 2002/0081031 A1 | 6/2002 | Suzuki | |
| 2002/0126315 A1 * | 9/2002 | Nabeshima | 358/3.03 |

FOREIGN PATENT DOCUMENTS

| | | |
|---|---|---|
| JP | 8-65513 | 3/1996 |
| JP | 8-79513 | 3/1996 |
| JP | 2000-224417 | 8/2000 |
| JP | 2001-268361 | 9/2001 |

* cited by examiner

|  | OUTSIDE DOT AREA | | INSIDE DOT AREA | |
|---|---|---|---|---|
|  | OUTSIDE EDGE | INSIDE EDGE | OUTSIDE EDGE | INSIDE EDGE |
| CONTOUR OF CHARACTER | F2 | F6 | F3 | F5 |
| CONTOUR OF NON-CHARACTER | F3 | F5 | – | – |
| FINE LINE | F1 | F7 | F2 | F6 |

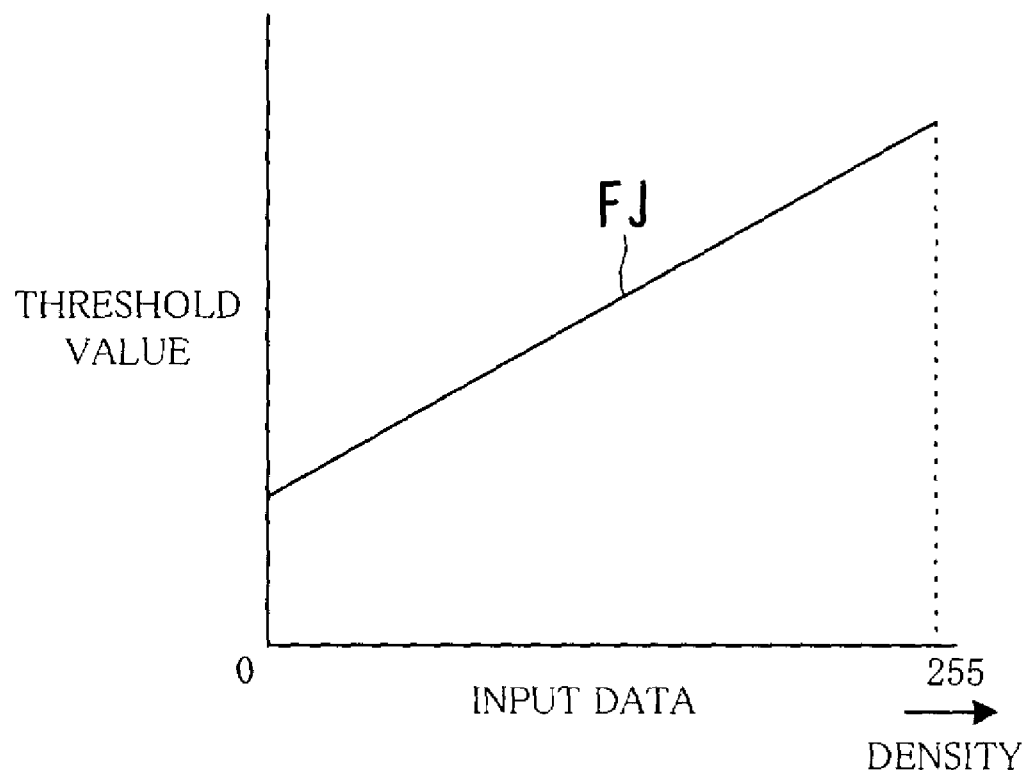

METHOD AND APPARATUS FOR IMPROVING EDGE SHARPNESS WITH ERROR DIFFUSION

This application is based on Japanese Patent Application No. 2003-061431 filed on Mar. 7, 2003, the contents of which are hereby incorporated by reference.

BACKGROUND OF THE INVENTION

1. Field of the Invention

The present invention relates to a method and apparatus for processing an image so as to realize digital halftoning by utilizing an error diffusion method.

2. Description of the Prior Art

Conventionally, in a laser printer or a copying machine, an original halftone image such as a photograph image can be reproduced faithfully by utilizing a dithering method or the error diffusion method that reduces the number of bits.

The error diffusion method is one of digital halftone expression methods that can reproduce an original halftone image such as a photograph image by reducing the number of bits of the same. In the error diffusion method, a gradation level of an original image is converted into low valued data by using a constant threshold level, and an error between a data value (a density value) of a target pixel and a density value of the low valued data corresponding thereto is distributed to plural peripheral pixels in a predetermined area after being weighted. The error diffusion method can realize a relatively faithful image since a density of an original image can be retained.

In general, an original image is a mixture of a dot image, a character image and a fine line image in addition to a photograph image. In order to reproduce these images of different types or different attributions as faithfully as possible without deteriorating the image quality, it is necessary to process the image appropriately for each area. For example, there is a method of switching the process in accordance with a result of detecting a character area or a photograph area in an image (see U.S. Pat. No. 5,787,195).

If the error diffusion process is performed, a problem is that generation of a dot is delayed at an edge portion. In other words, if input data have 256-step gradation for example, it is supposed that a threshold level is set to "128" for the error diffusion process so as to perform binarization. If there is a black character on a pale background having a color close to white, the data value is very small outside the edge portion of the black character. Therefore, a cumulative value of the error reaches the threshold value very slowly after the output is turned on by the error diffusion process and a dot is made. As a result, the next dot is hardly generated. Thus, even if the edge portion of the black character comes, a dot is not generated promptly, i.e. generation of a dot is delayed.

As a solution to this problem, there is a conventional method in which the threshold value is changed in accordance with a data value of input data. Namely, as represented by a threshold function FJ shown in FIG. 7, the threshold value is decreased if the data value of the input data is small, while it is increased if the data value is large. Thus, a dot can be generated promptly in a pale image.

In that case, however, an edge may become blurring at an edge portion of the black character, and sharpness of the character may be deteriorated. This may be a contributing factor of deterioration of quality of the whole image.

SUMMARY OF THE INVENTION

An object of the present invention is to improve sharpness of a character by preventing an edge portion of the character from blurring, so that the image quality can be improved.

According to one aspect of the present invention, an apparatus for processing an image includes an inside and outside edge discrimination portion for discriminating whether a target pixel to be processed belongs to an inside edge or to an outside edge, a threshold value generating portion for selecting a threshold value from plural threshold values for error diffusion process in accordance with an area discriminated by the inside and outside edge discrimination portion to output the selected threshold value, and an error diffusion process portion for performing the error diffusion process for multi-level input data concerning the target pixel by utilizing the threshold value generated by the threshold value generating portion so as to produce output data whose gradation steps are reduced.

Preferably, the apparatus further includes an area discrimination portion for discriminating an attribution of the area to which the target pixel belongs in accordance with brightness data obtained from the input data.

Further, the area discrimination portion includes a dot discrimination portion for discriminating whether or not the target pixel belongs to a dot area, a character discrimination portion for discriminating whether or not the target pixel belongs to a character area, a contour discrimination portion for discriminating whether or not the target pixel belongs to a contour area, and a fine line discrimination portion for discriminating whether or not the target pixel belongs to a fine line area.

In this way, the type of an area of a target pixel is discriminated in detail, and a threshold value that is selected in accordance with an image area is used so that an optimal image can be obtained

BRIEF DESCRIPTION OF THE DRAWINGS

FIG. 7 is a diagram showing a threshold function that is used in the conventional method.

DESCRIPTION OF THE PREFERRED EMBODIMENTS

Hereinafter, the present invention will be explained more in detail with reference to embodiments and drawings.

Figure 1:
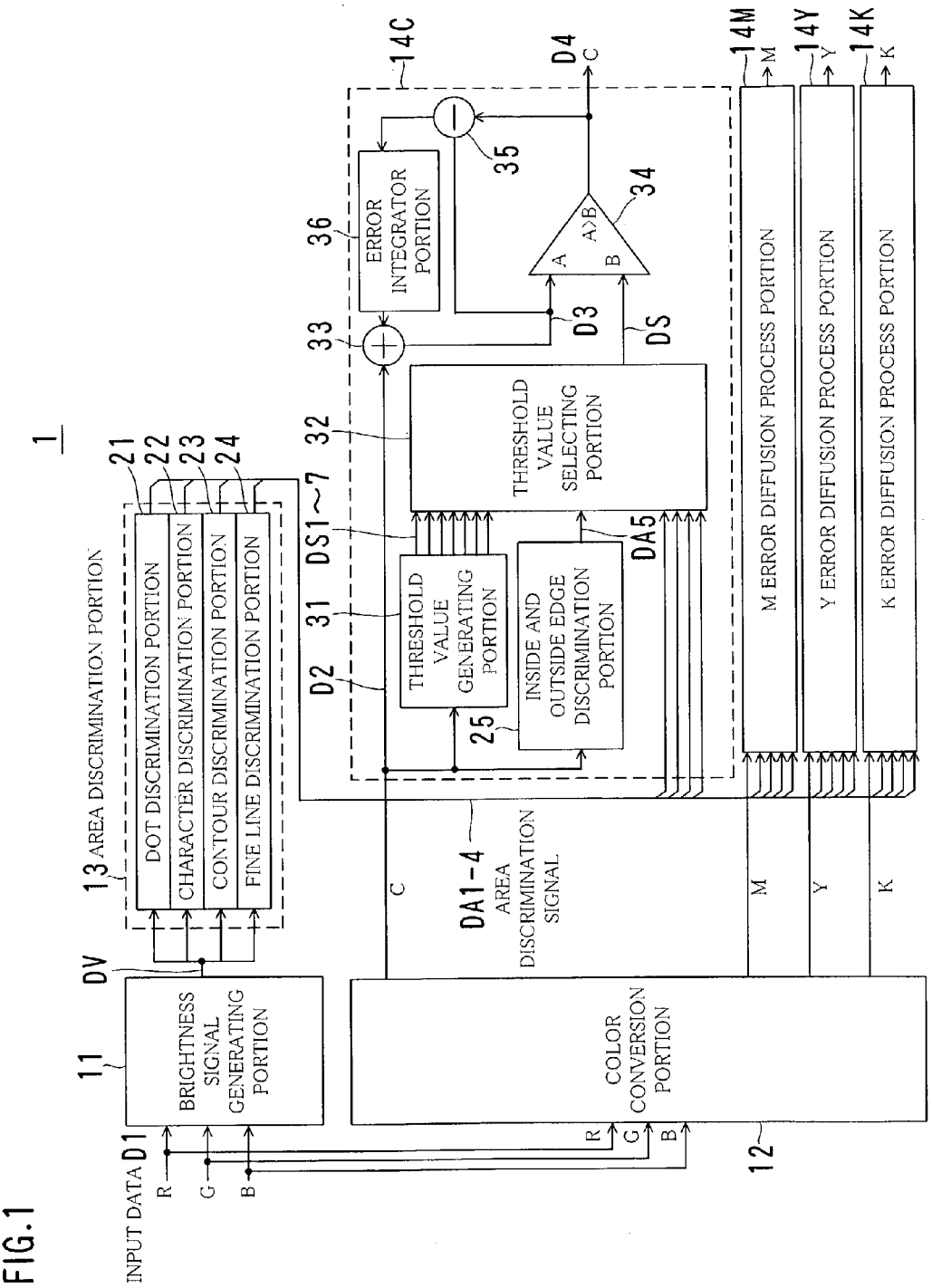
FIG. 1 is a block diagram showing a structure of an image processing apparatus according to an embodiment of the present invention.
Figures 2, 3:
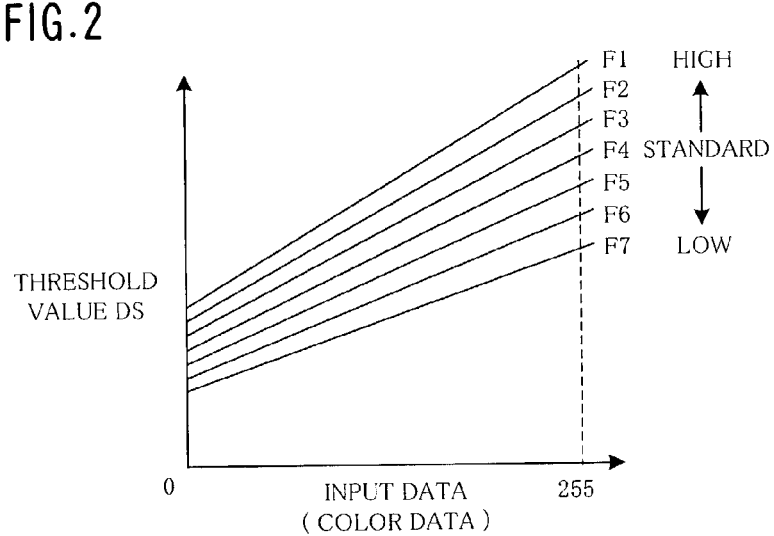
FIG. 2 is a graph showing an example of a threshold function that is generated by a threshold value generating portion.
FIG. 3 is a table showing a relationship between various areas and the threshold functions to be selected.
Figure 4:
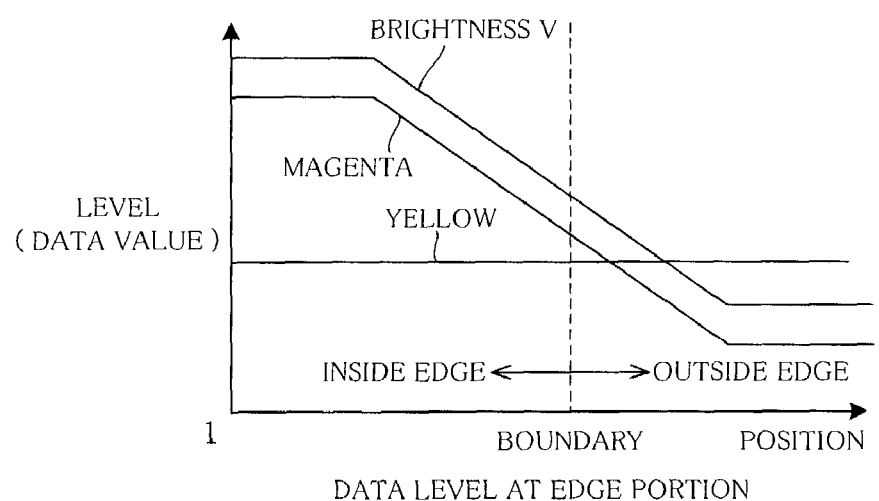
FIG. 4 is a graph for explaining necessity of an inside and outside edge decision process that is prepared for each color.

FIG. 1 is a block diagram showing a structure of an image processing apparatus 1 according to an embodiment of the present invention. FIG. 2 is a graph showing an example of a threshold function that is generated by a threshold value generating portion. FIG. 3 is a table showing a relationship between various areas and the threshold functions to be selected. FIG. 4 is a graph for explaining necessity of an inside and outside edge decision process that is prepared for each color.

The image processing apparatus 1 shown in FIG. 1 receives input data D1 of red, green and blue color image data, having 256-step gradation (8 bits) for each color, performs an error diffusion process to the data D1, and outputs binary (1 bit) color image data of C, M, Y and K as output data D4, which has a small number of gradation steps. The number of gradation steps of the output data D4 is not limited to two (1 bit). For example, four gradation steps (2 bits), eight gradation steps (3 bits) or sixteen gradation steps (4 bits) can be used in accordance with the number of gradation steps of an output device.

The image processing apparatus 1 is used as a partial function of an image processing apparatus that utilizes a copying machine, a printer, an image reader or a personal computer, for example. Namely, the color input data D1 are supplied via a CCD image sensor, an analog to digital converter, a shading correction portion and others, and are processed in the error diffusion process to be an output data D4. After that, the output data D4 are supplied to a print engine via a γ-correction portion, a print position control portion and a digital to analog converter, for example. Otherwise, the output data D4 are supplied to a display device.

As shown in FIG. 1, the image processing apparatus 1 includes a brightness signal generating portion 11, a color conversion portion 12, an area discrimination portion 13 and error diffusion process portions 14C, 14M, 14Y and 14K.

The area discrimination portion 13 includes a dot discrimination portion 21, a character discrimination portion 22, a contour discrimination portion 23, and a fine line discrimination portion 24. Each of the error diffusion process portions 14C, 14M, 14Y and 14K includes an inside and outside edge discrimination portion 25, a threshold value generating portion 31, a threshold value selecting portion 32, a adder portion 33, a comparator portion 34, a subtracting portion 35, and an error integrator portion 36.

The brightness signal generating portion 11 generates brightness data (a brightness signal) DV in accordance with red, green and blue input data D1. In general, the brightness V can be expressed by the following equation (1).

$$V = Ar \times R + Ag \times G + Ab \times B \quad (1)$$

Here, Ar, Ag and Ab are coefficients having appropriate values for generating the brightness data DV. R, G and B are data values of red, green and blue input data D1, respectively.

Furthermore, as the brightness data DV, a data value of G, or a minimum or maximum value of red, green and blue input data D1 can be used.

The color conversion portion 12 converts the red, green and blue input data D1 into input data D2 of C, M, Y and K colors.

The area discrimination portion 13 decides an area attribution, i.e., which image area the target pixel to be processed of the input data D1 belongs to, in accordance with the brightness data DV.

The dot discrimination portion 21 decides whether or not the target pixel belongs to a dot area and outputs a discrimination signal DA1.

The character discrimination portion 22 decides whether or not the target pixel belongs to a character area and outputs a discrimination signal DA2. The character area means an area that is recognized as a character and is usually a printed area of a font.

The contour discrimination portion 23 decides whether or not the target pixel belongs to a contour area and outputs a discrimination signal DA3. The contour area means a part of 2-3 dots width at an edge portion in a photograph or an edge portion of a character. There is no contour area in a dot image. Also, a fine line does not include a contour area since it is thin.

The fine line discrimination portion 24 decides whether or not the target pixel belongs to a fine line area and outputs a discrimination signal DA4. The fine line area means a fine line having a width of 2-3 dots or less or a fine portion at an edge portion of a character of a Mincho font.

These discrimination signals DA1-DA4 are supplied to the error diffusion process portions 14C, 14M, 14Y and 14K of each color.

The error diffusion process portions 14C, 14M, 14Y and 14K perform the error diffusion process for the input data D2 of C, M, Y and K colors and outputs binary output data D4 for each color. The error diffusion process portions 14C, 14M, 14Y and 14K have the same structure and the same operation. Therefore, one of them, i.e., the error diffusion process portion 14C will be explained.

The inside and outside edge discrimination portion 25 decides whether the target pixel belongs to an inner side of an edge or an outer side of the edge and outputs a discrimination signal DA5.

The threshold value generating portion 31 outputs plural threshold values DS1-DS7 in accordance with the data value (the gradation value) of the C input data D2.

As shown in FIG. 2, the plural threshold values DS1-DS7 correspond to data values in threshold functions F1-F7 that are lines having different gradients, respectively. Namely, each of the threshold functions F1-F7 indicates a relationship between the data value of the input data D2 and the threshold values DS1-DS7. The medium threshold function F4 is a standard threshold function, which is the same as the threshold function FJ explained as a prior art. The three threshold functions F1-F3 have higher values as a whole and have higher gradients than the standard threshold function F4. The remained three threshold functions F5-F7 have lower values as a whole and have lower gradients than the standard threshold function F4.

Therefore, in the case of the threshold function F3 for example, dots are harder to be generated than in the case of the standard threshold function F4. Dots become much harder to be generated in the case of the threshold functions F2 and F1. On the contrary, in the case of the threshold function F5, dots are easier to be generated than in the case of the standard threshold function F4. Dots become much easier to be generated in the case of the threshold functions F6 and F7.

As being explained later, the threshold functions F1-F3 that make dots harder to be generated are used for outside of edges, while the threshold functions F5-F7 that make dots easier to be generated are used for inside of edges, usually.

The relationship between these threshold functions F1-F7 or the data values indicated by the threshold functions F1-F7 and the threshold values DS1-DS7 is stored as a calculation program or a data table in an appropriate memory in the threshold value generating portion 31.

The threshold value generating portion 31 outputs seven different threshold values DS1-DS7 corresponding to the data values that are given by the input data D2.

The threshold value selecting portion 32 selects one threshold value DS from the seven threshold values DS1-DS7 supplied by the threshold value generating portion 31 in accordance with the discrimination signals DA1-DA4 from the area discrimination portion 13 and the discrimination signal DA5 from the inside and outside edge discrimination portion 25.

The threshold value generating portion 31 and the threshold value selecting portion 32 constitute a threshold value generating portion of the present invention.

The adder portion 33 adds the input data D2 of each color and the error data. The result data are supplied to the comparator portion 34 as input data D3 before binarization.

The comparator portion 34 compares the input data D3 with the threshold value DS and turns on or off the output in accordance with the comparison result.

The subtracting portion 35 calculates an error between the output data D4 after the binarization and the input data D3 before the binarization. On this occasion, the gradation property of the output data D4 and that of the input data D3 are adjusted to each other by multiplying the output data D4 by an appropriate number.

The error integrator portion 36 accumulates the error and outputs the accumulated error to the adder portion 33 so as to distribute it to peripheral pixels surrounding the target pixel.

Structures and operations of the dot discrimination portion 21, the character discrimination portion 22, the contour discrimination portion 23, the fine line discrimination portion 24 and the inside and outside edge discrimination portion 25 are known (see Japanese unexamined patent publication 2000-224417, for example). In addition, a structure and an operation of the error diffusion process by the adder portion 33, the comparator portion 34, the subtracting portion 35 and the error integrator portion 36 are known. Therefore, various conventional methods and circuits can be adopted for these known structures and the operation.

Next, the selection of the threshold values DS1-DS7 in the threshold value selecting portion 32 will be explained.

As shown in FIG. 3, a contour of a character means an edge portion of the character. The contour of a character is processed with relatively strong edge enhancement. A contour except a character means an edge portion in a photograph image. A contour except a character is processed with weak edge enhancement. A fine line is processed with strongest edge enhancement. In a dot area, the edge enhancement is weakened relatively to the outside of the dot area for preventing a rough tone of the image.

Namely, in FIG. 3, the threshold function F is different between the outside edge and the inside edge concerning a contour of a character, a contour of non-character and a fine line. One of the threshold functions F1-F3 that are higher than the standard threshold function F4 is used for the outside edge, while one of the threshold functions F5-F7 that are lower than the standard threshold function F4 is used for the inside edge. Furthermore, the threshold function F is used for the outside the dot area, so that the edge enhancement effect becomes stronger in the outside than in the inside the dot area. In addition, the threshold function F is used for a fine line, a contour of a character and a contour of non-character, so that the edge enhancement effect becomes stronger in this order.

The more the threshold functions F that are used for the outside edge and the inside edge are apart from each other, the bigger the edge enhancement effect are. Namely, the strongest edge enhancement effect is obtained in the combination of the threshold functions F1 and F7, and the edge enhancement effect becomes weaker in the combination of the threshold functions F2 and F6, and it becomes much weaker in the combination of the threshold functions F3 and F5. It is possible to use the standard threshold function F4 for one of the outside edge and the inside edge and to use one of the threshold functions F5-F7 or one of the threshold functions F1-F3 for the other. Otherwise, it is possible to use a threshold function having the constant threshold value "128" for the outside edge and to use a threshold function having a less threshold value for the inside edge. Thus, selecting or combining the threshold function F enables the edge enhancement effect to be adjusted.

In the example of FIG. 3, concerning a contour of a character, if the character is outside a dot area, the threshold function F2 is used for an outside edge of the character, while the threshold function F6 is used for an inside edge of the character. In this way, it becomes easy to generate dots at the inside edge, and difficult at the outside edge. As a result, appropriate dots are easily generated at the inside edge of the character, while undesired dots are hardly generated at the outside edge, so that fuzzy edges are suppressed at edge portions of a character and sharpness of a character is improved.

In addition, if the character is inside the dot area, the threshold functions to be used are F3 and F5, so that the edge enhancement effect is suppressed compared with the case where the character is outside the dot area. Thus, generation of moire is suppressed when the edge enhancement is performed, and roughness of the image is suppressed.

Furthermore, concerning a fine line, if the fine line is outside the dot area, the threshold function F1 is used for the outside edge of the fine line, while the threshold function F7 is used for the inside edge of the fine line. In this way, the maximum edge enhancement effect can be obtained, and sharpness of the fine line is enhanced. If the fine line is inside the dot area, the threshold functions F2 and F6 are used, so that the edge enhancement effect is suppressed compared with the case where the fine line is outside the dot area. In either case where the fine line is inside or outside the dot area, a threshold function having stronger edge enhancement effect than in the case for an area except the fine line, i.e., a character area, for example, is used for the fine line.

Thus, a contour of a character becomes sharp, blur edges are reduced, and image quality of a whole image is improved.

In general, when the edge enhancement process is performed, an area discrimination process is performed in accordance with the brightness data DV, and the edge enhancement process is performed for each color in accordance with the discrimination result. However, in this embodiment, each of the error diffusion process portions 14C, 14M, 14Y and 14K is provided with the inside and outside edge discrimination portion 25, so that the discrimination of the inside and outside edge is performed in accordance with the input data D2 of each color independently from each other. The effect of this process will be explained below.

In order to explain the necessity of the independent inside and outside edge decision process for each color, an image having a red character on a yellow background is supposed.

Namely, at an edge portion in this case, as shown in FIG. 4, yellow (Y) has a constant level that is relatively low, and magenta (M) has a level that is decreasing from the inside to the outside of the character. The level of the brightness V is altered in the same tendency at a position a little above the level of magenta.

If the inside and outside edge decision process is performed in accordance with the brightness data DV, the position shown by the vertical broken line in FIG. 4 is decided to be a boundary of the edge portion. Therefore, the right side of the boundary becomes the outside edge, and the left side becomes the inside edge.

Using this discrimination result, if the threshold value DS of the error diffusion process is selected for magenta and yellow input data D2, the strong edge enhancement process is performed on the yellow input data D2, too. As a result, dots are increased and become dense at the inside edge of yellow, while dots of yellow disappear at periphery of the outside edge, so that the background color is eliminated. As a result, void will happen at the periphery of the character.

On the contrary, as this embodiment, if the inside and outside edge decision process is performed independently for each color, yellow is not discriminated as an edge, so that such phenomenon is not generated and the void at the periphery of the character is prevented.

In the image processing apparatus 1 of this embodiment, the dot discrimination portion 21, the character discrimination portion 22, the contour discrimination portion 23 and the fine line discrimination portion 24 are provided only one each, perform the corresponding discrimination in accordance with the brightness data DV, and only the inside and outside edge discrimination portion 25 is provided for each of the error diffusion process portions 14C, 14M, 14Y and 14K. Therefore, cost performance is enhanced as a whole.

However, it is possible to change the entire structure as below.

Figure 5:
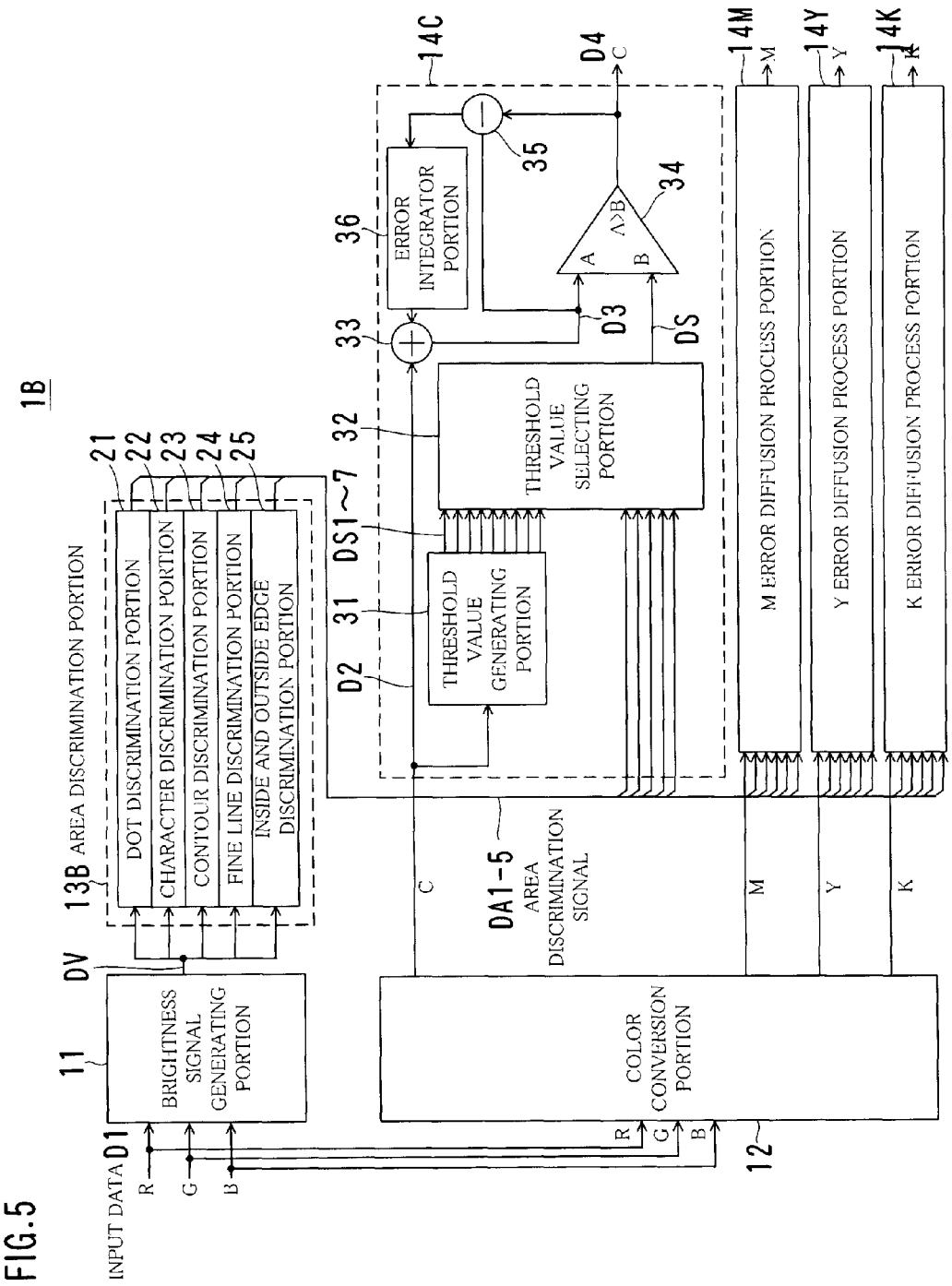
FIG. 5 is a block diagram showing a structure of an image processing apparatus in another embodiment.
Figure 6:
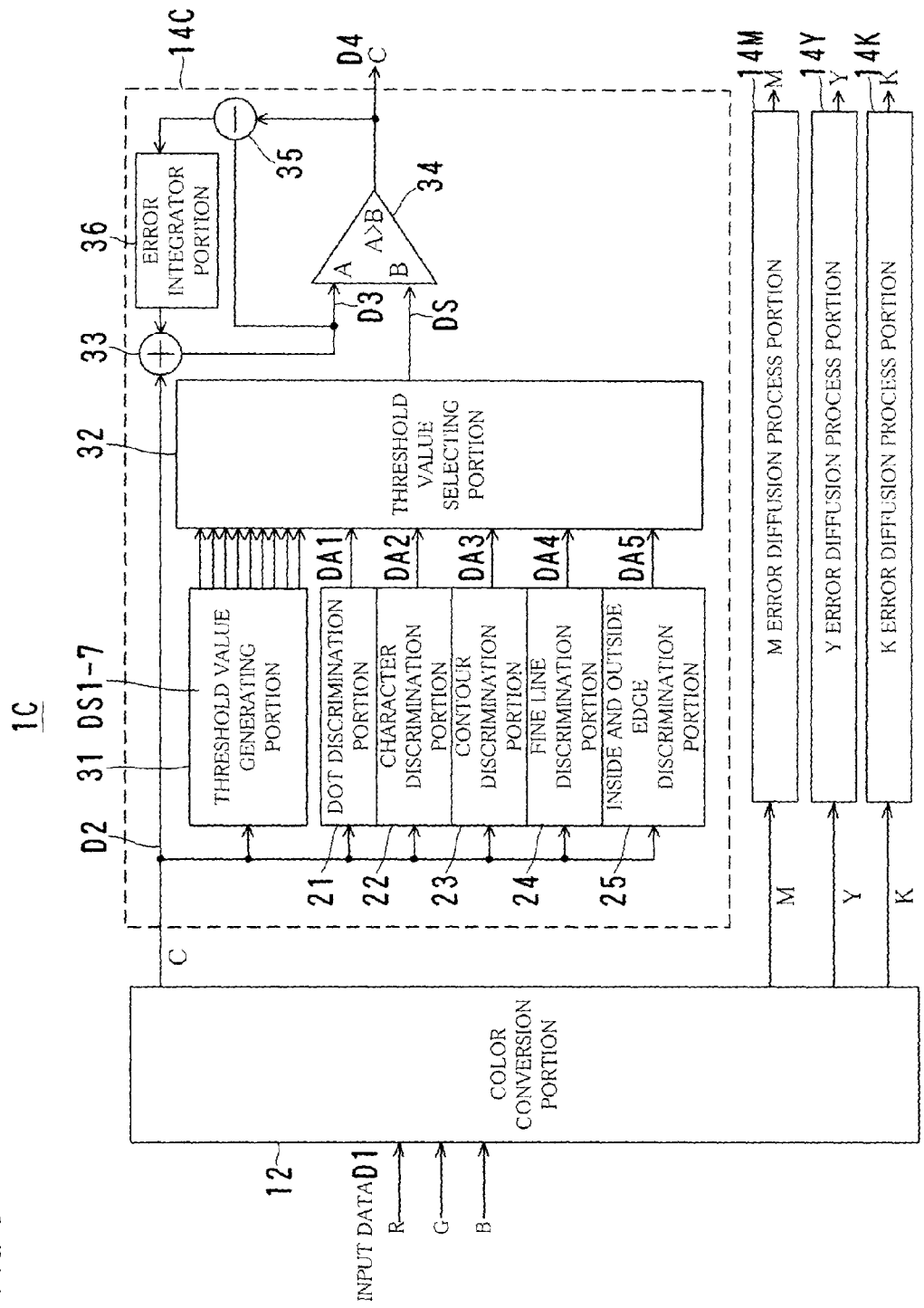
FIG. 6 is a block diagram showing a structure of an image processing apparatus in still another embodiment.

FIG. 5 is a block diagram showing a structure of an image processing apparatus 1B in another embodiment. FIG. 6 is a block diagram showing a structure of an image processing apparatus 1C in still another embodiment.

In the image processing apparatus 1B shown in FIG. 5, the inside and outside edge discrimination portion 25 is provided only one inside the area discrimination portion 13B, so as to perform the inside and outside edge discrimination in accordance with the brightness data DV. In this case, the structure is realized in low cost though there is still the drawback mentioned above.

In the image processing apparatus 1C shown in FIG. 6, all of the dot discrimination portion 21, the character discrimination portion 22, the contour discrimination portion 23, the fine line discrimination portion 24 and the inside and outside edge discrimination portion 25 are provided one for each of the error diffusion process portions 14C, 14M, 14Y and 14K, so as to perform the corresponding area discrimination for the input data D2 of each color C, M, Y or K. In this case, an optimal process is performed for the input data D2 of each color, though there is a disadvantage in cost.

Though it was explained that the threshold function is a straight line in the above-mentioned embodiment, it can be a curve. Though the explanation was performed for the case where there are seven threshold functions, there can be six or less threshold functions, or eight or more threshold functions. Though the case where the input data D1 and D2 have 256-step gradation is explained, the present invention can be applied to input data that have other gradation steps. The present invention can be applied to various color image data as the input data D1.

In the above-mentioned embodiment, the threshold value generating portion 31 generates plural threshold values DS, and the threshold value selecting portion 32 selects one of them. However, it is possible to generate only one threshold value DS that is selected from plural threshold values that can be generated.

In the above-mentioned embodiment, the process of each of the image processing apparatuses 1, 1B and 1C can be realized by a hardware circuit, or software by using a CPU and a memory that stores an appropriate program, or by combining the hardware and the software. The structure of each portion of the image processing apparatuses 1, 1B and 1C or the entire structure, the circuit thereof, the number thereof, the process thereof and others can be modified in the scope of the present invention.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. An apparatus for processing an image, comprising;
an inside and outside edge discrimination portion for discriminating whether a target pixel to be processed belongs to an inner side of an edge or an outer side of the edge;
a threshold function storing portion for storing a plurality of variable threshold functions corresponding to input image data and a threshold value;
a threshold value generating portion for generating a plurality of threshold values, each of the threshold values being determined by input image data and a respective one of the variable threshold functions;
a threshold value selecting portion for selecting one of the plurality of threshold values for an error diffusion process in accordance with a discrimination result discriminated by the inside and outside edge discrimination portion and outputting the selected threshold value; and
an error diffusion process portion for performing the error diffusion process for multilevel input data concerning the target pixel by utilizing the threshold value generated by the threshold value generating portion so as to produce output data whose gradation steps are reduced.

2. The apparatus according to claim 1, wherein the inside and outside edge discrimination portion discriminates in accordance with data of each color of the input data.

3. The apparatus according to claim 2, further comprising an area discrimination portion for discriminating an attribution of the area to which the target pixel belongs in accordance with brightness data obtained from the input data.

4. The apparatus according to claim 3, wherein the threshold value selecting portion selects a threshold value in accordance with the discrimination results of the inside and outside edge discrimination portion and the area discrimination portion.

5. The apparatus according to claim 3, wherein the area discrimination portion includes
a dot discrimination portion for discriminating whether or not the target pixel belongs to a dot area,
a character discrimination portion for discriminating whether or not the target pixel belongs to a character area,
a contour discrimination portion for discriminating whether or not the target pixel belongs to a contour area, and
a fine line discrimination portion for discriminating whether or not the target pixel belongs to a fine line area.

6. An apparatus for processing an image, comprising:
a dot discrimination portion for discriminating whether or not a target pixel to be processed belongs to a dot area;
a character discrimination portion for discriminating whether or not the target pixel belongs to a character area;
a contour discrimination portion for discriminating whether or not the target pixel belongs to a contour area;
a fine line discrimination portion for discriminating whether or not the target pixel belongs to a fine line area;
an inside and outside edge discrimination portion for discriminating whether the target pixel belongs to an inner side of an edge or an outer side of the edge;
a threshold function storing portion for storing a plurality of variable threshold functions corresponding to input image data and a threshold value;
a threshold value generating portion for generating a plurality of threshold values, each of the threshold values being determined by input image data and a respective one of the variable threshold functions;

a threshold value selecting portion for selecting one of the plurality of threshold values for an error diffusion process in accordance with an area discriminated by at least one of the dot discrimination portion, the character discrimination portion, the contour discrimination portion, the fine line discrimination portion and the inside and outside edge discrimination portion to outputting the selected threshold value; and an error diffusion process portion for performing the error diffusion process for multilevel input data concerning the target pixel by utilizing the threshold value generated by the threshold value generating portion so as to produce output data whose gradation steps are reduced.

7. The apparatus according to claim 6, wherein the threshold value selecting portion selects a threshold value that has less edge enhancement effect in the case where the target pixel belongs to the character area, the contour area or the fine line area, and the target pixel belongs inside the dot area than in the case where the target pixel belongs outside the dot area.

8. The apparatus according to claim 6, wherein when the target pixel belongs to the fine line area, the threshold value selecting portion selects a threshold value that has more edge enhancement effect than in the case where the target pixel belongs to the contour area.

9. The apparatus according to claim 6, wherein when the input data are data of a color image, the dot discrimination portion, the character discrimination portion, the contour discrimination portion and the fine line discrimination portion discriminate in accordance with brightness data obtained from the input data.

10. The apparatus according to claim 9, wherein the inside and outside edge discrimination portion discriminates in accordance with data of each color of the input data.

11. The apparatus according to claim 6, wherein when the input data are data of a color image, the dot discrimination portion, the character discrimination portion, the contour discrimination portion, the fine line discrimination portion, and the inside and outside edge discrimination portion discriminate in accordance with brightness data obtained from the input data.

12. The apparatus according to claim 6, wherein when the input data are data of a color image, the dot discrimination portion, the character discrimination portion, the contour discrimination portion, the fine line discrimination portion, and the inside and outside edge discrimination portion discriminate in accordance with data of each color of the input data independently from each other.

13. The apparatus according to claim 6, wherein the threshold value selecting portion selects a threshold value in accordance with the areas discriminated by two or more of the dot discrimination portion, the character discrimination portion, the contour discrimination portion, the fine line discrimination portion, and the inside and outside edge discrimination portion.

14. A method for processing an image, comprising:
using a circuit or a processor to discriminate whether a target pixel to be processed belongs to an inner side of an edge or an outer side of the edge;
storing a plurality of variable threshold functions corresponding to input image data and a threshold value;
generating a plurality of threshold values, each of the threshold values being determined by input image data and a respective one of the variable threshold functions;
selecting one of the plurality of threshold values for an error diffusion process in accordance with a discrimination result as to whether the target pixel to be processed belongs to an inner side of an edge or an outer side of the edge and outputting the selected threshold value; and
performing the error diffusion process for multilevel input data concerning the target pixel by utilizing the generated threshold value so as to produce output data whose gradation steps are reduced.

15. The method according to claim 14, wherein the discriminating, selecting and performing the error diffusion process are performed for each color independent of other colors.

16. The method according to claim 15, further comprising:
determining a brightness of the target pixel; and
determining whether the target pixel belongs to a dot area, a character area, a contour area, or a fine line area based on the brightness of the target pixel determined,
wherein the step of selecting the threshold value further comprises selecting the threshold value based on the determination of whether the target pixel belongs to the dot area, the character area, the contour area, or the fine line area.

17. The method according to claim 16,
wherein the character area is a printed area of a font,
wherein the contour area is an area within a predetermined distance from an edge portion of a photograph or an edge portion of a character,
wherein the fine line area is a line having a predetermined width or less, and
wherein the contour area is not a part of the dot area.

18. The method according to claim 16, wherein the step of determining the brightness of the target pixel comprises determining the brightness based on at least one of weighted contributions of each component color of the target pixel, a green color data value of the target pixel, or a minimum or maximum value of the component colors of the target pixel.

19. The method according to claim 16, wherein the step of selecting the threshold value further comprises selecting the threshold value such that edge enhancement is stronger outside the dot area than inside the dot area, edge enhancement is stronger for the fine line area than the contour area, or both.

20. The method according to claim 15, further comprising:
generating the plurality of threshold values based on a value of a particular color of the target signal.

21. An apparatus for processing an image, comprising:
an inside and outside edge discrimination portion for discriminating whether a target pixel to be processed belongs to an inner side of an edge or an outer side of the edge;
an area discrimination portion for discriminating an attribution of an area to which the target pixel belongs;
a threshold function storing portion for storing a plurality of variable threshold functions corresponding to input image data and a threshold value;
a threshold value generating portion for generating a plurality of threshold values, each of the threshold values being determined by input image data and a respective one of the variable threshold functions;
a threshold value selecting portion for selecting one of the plurality of threshold values for an error diffusion process,
wherein the predetermined threshold function is selected based on a result of the area discrimination portion, and wherein the threshold value is selected in accordance with a discrimination result discriminated by the inside and outside edge discrimination portion; and
an error diffusion process portion for performing the error diffusion process for multilevel input data concerning the target pixel by utilizing the threshold value generated by the threshold value generating portion so as to produce output data whose gradation steps are reduced.

22. The apparatus according to claim 21, wherein the area discrimination portion includes a dot discrimination portion for discriminating whether or not the target pixel belongs to a dot area, a character discrimination portion for discriminating whether or not the target pixel belongs to a character area, a contour discrimination portion for discriminating whether or not the target pixel belongs to a contour area, and a fine line discrimination portion for discriminating whether or not the target pixel belongs to a fine line area.

23. The apparatus according to claim 21, wherein the threshold value generating portion selects a threshold value for each target pixel.

* * * * *